United States Patent [19]

Tavoni et al.

[11] 4,302,969
[45] Dec. 1, 1981

[54] APPARATUS FOR DETECTING CLIMATIC CONDITIONS FAVORING THE DEVELOPMENT OF SCAB ON FRUIT TREES

[75] Inventors: Gian Paolo Tavoni, Cambiano; Mario Baima, Turin, both of Italy

[73] Assignee: Centro Ricerche Fiat S.p.A., Orbassano, Italy

[21] Appl. No.: 158,047

[22] Filed: Jun. 10, 1980

[30] Foreign Application Priority Data

Jul. 18, 1979 [IT] Italy ................. 68490 A/79

[51] Int. Cl.³ ............................................ G01W 1/06
[52] U.S. Cl. ................................................ 73/170 R
[58] Field of Search ................. 73/170 R, 336, 339 C, 73/344

[56] References Cited

U.S. PATENT DOCUMENTS 3,141,330   7/1964   Murray et al. .................... 73/170 R

FOREIGN PATENT DOCUMENTS 2305744  10/1976   France ................................ 73/170

*Primary Examiner*—S. Clement Swisher

*Attorney, Agent, or Firm*—Sughrue, Mion, Zinn, Macpeak and Seas

[57] ABSTRACT

For an infestation of scab to develop through its initial stages requires the presence of prolonged periods of leaf surface wetness to enable the spores to germinate. Apparatus is provided which monitors the ambient temperature and humidity to detect the occurrence of periods of leaf wetness sufficient to permit the initial development of an infestation. When the occurrence of such a period of wetness is detected, the apparatus changes its operating state to indicate the progress of the infestation through its secondary stages, this progress being dependent on the ambient temperature but not the wetness of the leaves. The apparatus follows the progress of the infestation by means of a monitoring device which generates a pulsed signal whose frequency is dependent on the ambient temperature and humidity, the pulses of this signal being then counted in counter means and selectively displayed on a display. A leaf wetness sensor is arranged to inhibit the counter means during the initial infestation stage except in the presence of conditions favoring spore development.

9 Claims, 2 Drawing Figures

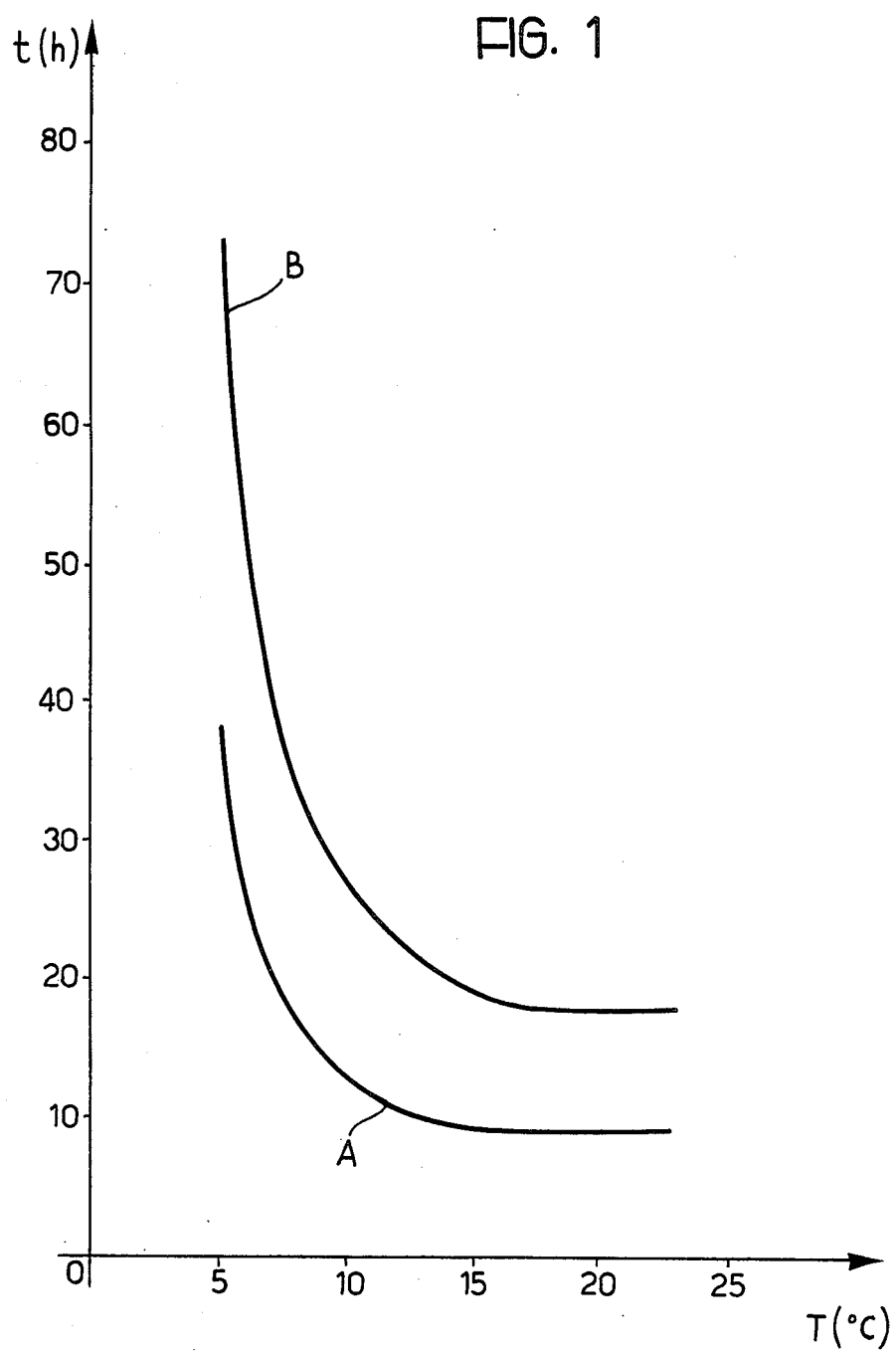

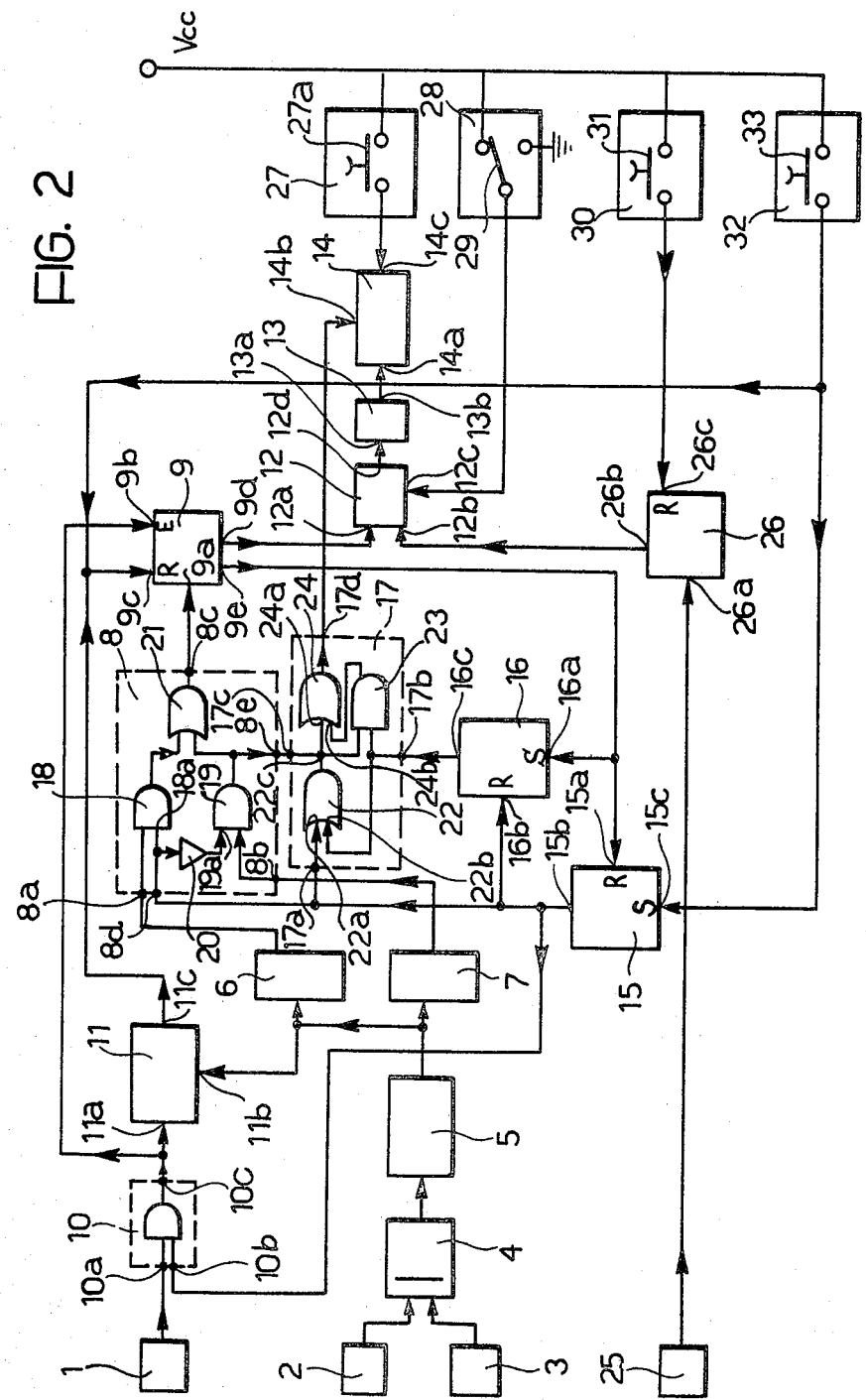

APPARATUS FOR DETECTING CLIMATIC CONDITIONS FAVORING THE DEVELOPMENT OF SCAB ON FRUIT TREES

The present invention relates to apparatus for detecting the climatic conditions favourable to the development of scab on fruit trees and for indicating when a fungicidal treatment should be effected.

As is known, the germination of the spores (ascospores and conidiospores) on the surfaces of the leaves of fruit trees takes place if the leaf surfaces are sufficiently saturated for a total of at least eight hours occurring either uninterruptedly or interrupted by a period of dryness of a maximum duration of between three and twelve hours (depending on the temperature of the air).

If the leaves become dry before the completion of the said eight hours, and remain dry for a period of time greater than 3 to 12 hours (depending on the temperature of the air), the infestation does not develop. After successfully passing through the initial germination stage, the infestation enters a second stage in which the dryness of the leaves does not affect its development; in this second stage, the speed of advance of the infestation depends on the temperature.

The object of the present invention is to provide apparatus for detecting the climatic conditions favourable to the development of scab on fruit trees (particularly of the apple family) and for indicating the most suitable period for treating the infestation.

With a view to achieving this object, the present invention provides apparatus comprising:

a memeory settable into first and second states which correspondingly determine first and second operational states of the apparatus;

a manually-operable control device for setting the memory into its first state;

a monitoring device controlled by said memory to operate in accordance with the current state of the apparatus, said monitoring device including:

temperature and humidity sensors arranged to monitor the ambient temperature and humidity, a pulsed signal generator connected to said sensors and arranged to output a first pulsed signal to be counted when the apparatus is in its first state, and a second pulsed signal to be counted when the apparatus is in its second state, the frequencies of said first and second pulsed signals being differently related to the ambient temperature and humidity, and counter means connected to said pulsed signal generator and operative in the first state of the apparatus to effect a first count by counting the pulses of said first pulsed signal, and in the second apparatus state to effect a second count by counting the pulses of said second pulsed signal, the counter means including reset and enable inputs and being arranged upon completion of said first count to set the memory into its second state, count enable means connected to the said enable input of the counter means and including a sensor arranged to output an enabling signal in the presence of leaf saturation or surface dampness conditions favouring the development of spores, the count enable means being controlled by said memory such that with the apparatus in its first state the counter means is enabled to effect said first count only when said enabling signal is present, while when the apparatus is in its second state the counter means is continuously enabled to effect said second count, a timer circuit connected to said count enable means and operative in the absence of said enabling signal when the apparatus is in its first state, to time a delay period upon the completion of which the timer circuit is arranged to output a reset signal to the reset input of the counter means, the reappearance of said enabling signal during the timing of said delay period being arranged to deactivate the timer circuit, and output means connected to said monitoring device and operable to provide a visual indication of the progress of the counting being effected by the counter means.

In its first state the apparatus is thus arranged to monitor the initial stage of an infestation (that is, germination of the spores) by timing the duration of periods of leaf saturation or surface dampness favourable to the development of the spores. If the total duration of such periods reaches a particular value (set by the time required for completion of the first count) without being interrupted by periods of dryness of a duration greater than that timed by the timer circuit, then the apparatus assumes that the infestation has progressed to its second stage of development and correspondingly sets itself into its second state. The progress of the infestation in its second stage is then followed by the second count which proceeds at a rate different from the first count.

The most suitable time for fungicidally treating the infestation is during the course of the second count. Treatment at this stage minimises the number of follow up treatments required which results in a significant saving in cost and a reduction of atmospheric pollution.

Apparatus embodying the invention will now be particularly described, by way of example, with reference to the accompanying drawings, in which:

FIG. 1 is a graph illustrating the relationship between the ambient temperature T (in degrees centigrade) and the time t (expressed in hours) required for an infestation of scab to reach a particular level of infestation, curves A and B showing this relationship for different infestation levels; and FIG. 2 is a block circuit diagram of the apparatus.

The apparatus now to be described is arranged to provide an indication of the advance of an infestation of scab on the leaves of fruit trees as a function of the climatic conditions prevailing.

As shown in FIG. 2, the apparatus comprises a sensor 1 for detecting a state of saturation or of surface dampness sufficient to allow the development of spores on the leaves of the fruit trees. This sensor 1 is constituted, for example, by a printed circuit covered by a sheet of filter paper (for example, of the Whatman type) which can be readily replaced. In use of the apparatus, this printed circuit is located amongst the fruit trees such as to be exposed to the rainfall or dew in the same way as the leaves of the trees.

Typically, the printed circuit has two groups of conductive strips, the strips of one group being interplaced with, and spaced from, the strips of the other group. Strips of the same group are connected to a connecting track. The value of electrical insulation between the two connecting tracks provides an indication of the wetness of the sensor surface and this insulation value can be measured in a standard manner using a circuit including an operational amplifier.

As an alternative to being covered by a sheet of filter paper, the printed circuit can be covered with a layer of lithium chloride or other hygroscopic substance.

The apparatus further comprises a temperature sensor 2 for measuring the ambient temperature in the field of fruit trees. This sensor 2 can be constituted, for example, by an NTC (negative temperature coefficient) temperature sensitive resistor which has a value of 45 K$\Omega$ at 25° C.

In addition, the apparatus is provided with a humidity sensor 3 in the form of an adjustable threshold hygrometer (that is, a hygrostat), for example of the type having a pair of normally open contacts which close when the humidity of the air exceeds the set threshold value.

The temperature sensor 2 is connected to the amplifying input of an amplifier 4 which, for example, is constituted by an operational amplifier provided with feedback circuitry. The hygrostat 3 is also connected to the amplifier 4, and is arranged upon closure of its contacts (not shown) to modify the transfer function of the amplifier 4.

The output of the amplifier 4 is connected to a voltage-to-frequency converter 5. This converter 5 is arranged to provide at its output a pulsed signal the frequency of which varies as a function of the amplitude of the voltage signal supplied from the amplifier 4. The output of the voltage-to-frequency converter 5 is connected to the input of a first frequency divider and to the input of a second frequency divider 7. The outputs of the first and second frequency dividers 6 and 7 are respectively connected to a first and to a second input 8a, 8b of a channel selector 8. A first output 8c of the channel selector 8 is connected to the count input 9a of a digital counter 9 which is additionally provided with a count enable input 9b and a reset input 9c.

The output of the leaf saturation/surface dampness sensor 1 is connected to a first input 10a of a logic comparison circuit 10 which in addition to its input 10a, has a second input 10b and an output 10c. The longic comparison circuit 10 can be constituted, for example, by a NAND gate.

The output 10c of the logic comparison circuit 10 is connected to the enable input 9b of the counter 9, and to an inhibit 11a of a timer circuit 11. A further input 11b of the timer circuit 11 is connected to the output of the voltage-to-frequency converter 5. The output 11c of the said timer circuit 11 is connected to the reset input 9c of the counter 9.

The counter 9 has two outputs 9d and 9e, the first of which is connected to a first input 12a of a second channel selector 12. The output 12b of the channel selector 12 is connected to an input 13a of a decoder circuit 13. The output 13b of the decoder circuit 13 is connected to the main input 14a of a display device 14 which is constituted, for example, by two seven segment displays, each display being capable of representing any number between "0" and "9" and being provided with a decimal point.

The second output 9e of the counter 9 is connected to the "reset" input 15a of a first latch memory 15, and to the "set" input 16a of a second latch memory 16. The output 15b of the memory 15 is connected to the control input 8d of the channel selector 8 and to the reset input 16b of the memory 16. In addition, the output 15b of the memory 15 is connected to a first input 17a of a logic control circuit 17. Second and third inputs 17b and 17c of the control circuit 17 are respectively connected to the output 16c of the memory 16 and to a second output 8b of the channel selector 8. The output 17d of the logic control circuit 17 is connected to a first control input 14b of the display device 14.

The internal circuitry of the channel selector 8 and of the logic control circuit 17 will now be described.

In the embodiment illustrated in FIG. 2, the channel selector 8 comprises a pair of two-input AND gates 18, 19 the outputs 18b, 19b of which are connected to the inputs of an OR gate 21 whose output 8c constitutes the output of the channel selector 8. A first input 18a of the AND gate 18 is connected to the channel selector input 8d, which is also connected, via an inverter 20, to a first input 19a of the AND gate 19. The second inputs of the AND gates 18 and 19 are respectively connected to the channel selector inputs 8a and 8b. The output of the AND gate 19 is connected to the channel selector output 8e.

In the embodiment illustrated in FIG. 2, the logic control circuit 17 comprises a NOR gate 22 having two inputs 22a, 22b and an output 22c, the latter being connected to a first input 24a of an OR gate 24 whose output constitutes the output 17d of the logic control circuit 17. One input 22a of the NOR gate 22 is connected to the control circuit input 17a, while the other input 22b of the gate 22 is connected to the control circuit input 17b. This latter input 17b is also connected to one input 23b of a two-input AND gate 23, the other input of which is connected to the input 17c of the logic control circuit 17. The output of the AND gate 23 is connected to the second input 24b of the gate 24.

The internal circuitry of the channel selector 12 can, for example, be the same as the channel selector 8.

The apparatus further comprises an electrical rain gauge 25 of the type, known per se, operative to output a number of pulses proportional to the instantaneous value of the rainfall level. The output of the raingauge 25 is connected to the count input 26a of a counter 26 the output 26b of which is connected to a second input 12b of the second channel selector 12.

A first manually-operable control device 27 is interposed between a continuous voltage source $V_{cc}$ and a second control input 14c of the display device 14. The control device 27 can be constituted, for example, by a push button 27a as is illustrated in FIG. 2.

A second manually-operable control device 28 is interposed between the voltage source $V_{cc}$ and the control input 12c of the second channel selector 12. The control device 28 can be constituted, for example, by a changeover switch 29 having two positions in which, as is illustrated in FIG. 2, the control input 12c of the channel selector 12 is interconnected, respectively, with the voltage source $V_{cc}$ and with electrical earth.

A third manually-operable control device 30 is interposed between the voltage source $V_{cc}$ and a reset input 29c of the counter 26. The third control device 30 can be constituted, for example, by a push button 31, as is illustrated in FIG. 2.

A fourth manually-operable control device 32 is interposed between the voltage source $V_{cc}$ and the "set" input 15c of the memory 15. The fourth control device 32 can be constituted, for example, by a push button 33 as is illustrated in FIG. 2.

The operation of the apparatus will now be described.

The curves A and B shown in FIG. 1 are the well known Mills curves relating to the speed of advance of an infestation of scab, curve A corresponding to the so-called "level of minimum infestation" and curve B corresponding to the so-called "level of maximum infestation."

The progress of an infestation can be divided into an initial stage corresponding to germination of the spores and terminating when the curve A level of infestation is reached, and a second stage corresponding to the development of the infestation between the levels represented by curves A and B. As already mentioned, the germination stage of an infestation is highly dependent on the wetness of the fruit trees leaves. The apparatus in following the progress of the infestation is arranged to be set into first and second operational stages in correspondence to the infestation being in its initial and second stages; as will be more fully described hereinafter, the current operational state of the apparatus is determined by the state of the memory 15 (the "set" state of memory 15 corresponding to the first operational state of the apparatus).

From curves A and B it can be seen that the speed of advance of an infestation is temperature dependent. In order to simulate this dependency, the temperature sensor 2 is arranged to provide to the voltage-to-frequency converter 5 (via the amplifier 4) a voltage signal the amplitude of which is related to the instantaneous value of the ambient temperature. As a result, the voltage-to-frequency converter 5 outputs a pulse signal the frequency of which is related to the instantaneous value of the ambient temperature.

As can be seen from FIG. 1, the relationship between the speed of advance of an infestation and the ambient temperature is non-linear. To take account of this, the relationship between the frequency of the converter output signals and the ambient temperature detected by the temperature sensor 2 must be correspondingly non-linear. To this end, the amplifier 4 can be arranged to exhibit a non-linear gain characteristic by the use, for example, of an operational amplifier with a suitable feedback network. Alternatively, or additionally, the desired non-linearity can be achieved by making use of the non-linear portions of the transfer characteristic of the voltage-to-frequency converter 5.

The effect of the ambient humidity on the speed of advance of an infestation, manifests itself substantially as a translation of the infestation curves of FIG. 1 in a direction parallel to the time t axis. The FIG. 2 apparatus takes account of this effect by means of the hygrostat 3 which is arranged to vary the gain of the amplifier 4 as a function of the value of the ambient humidity.

At the start of the monitoring process, the apparatus is set into its first operating state by depression of the push button 33 which sets the memory 15 into a state in which its output 15b is at a logic level "1." As already described, the voltage-to-frequency converter 5 outputs a pulsed signal the frequency of which is dependent on the ambient temperature and humidity. This pulsed signal is fed to both frequency dividers 6, 7 and the signals output from these dividers 6, 7 are presented to the inputs 8a, 8b of the channel selector 8. The presence of a logic "1" at the output 15b of the memory 15 and thus at the control input 8d of the channel selector 8, causes the output signal from the frequency divider 6 to be fed to the input 9a of the counter 9. Provided that the sensor 1 detects the presence of conditions of leaf saturation or surface dampness favouring the development of zoospores, an enabling signal will be present at the intput 9b of the counter 9 so that this counter will start a first count, for example from "0" to "99," with a speed of counting dependent on the ambient temperature and on the division factor of the divider 6. The attainment by the counter 9 of the count value "99" indicates that the so-called "level of minimum infestation" represented by the curve A of FIG. 1 has been reached. If during the course of this first count, the conditions of leaf saturation or of surface dampness favouring the development of spores ceases, the sensor 1 provides at its output a signal of logic level "0" which inhibits the logic comparison circuit 10. Consequently, the logic comparison circuit 10 presents to the enable input 9b of the counter 9 a logic "0" which inhibits the counter. Simultaneously the logic comparison circuit 10 presents a logic "0" to the input 11a of the timer circuit 11. The timer circuit 11, which is arranged to be activated by the receipt of a logic "0" signal, is constituted by a counter connected to count the pulses output from the converter 5. Thus, after a predetermined time which is a function of the frequency of the converter output signal, the timer circuit 11 outputs a signal to the reset input 9c of the counter 9. This signal causes the zeroing of the said counter 9. However, if as the result of a new rainfall or dew, the output of the sensor 1 should return to logic "1" before the end of the time interval timed by the timer circuit 11, the logic comparison circuit 10 will re-enable the counter 9 and inhibit the timer circuit 11; the counter 9 will now resume counting from the number at which it had previously been stopped. During the first counting operation, the counter 9 provides at its output 9d a signal which, through the channel selector 12 and the decoder circuit 13, sets up the display device 14 to provide a visual indication of the progress of the count. Depression of the push button 27a will cause the elements of the display device 14 to light up appropriately.

When the counter 9 reaches the end of the first count, (that is, for example, when its count value reaches "99"), the counter 9 produces at its output 9e a logic "1" signal which is fed to the reset input 15a of the memory 15. As a result, the memory 15 changes state and its output 15b drops to logic level "0" causing the apparatus to be set into its second operational state. The channel selector 8 now causes the output of the frequency divider 7 to be presented to the input 9a of the counter 9. The counter 9 therefore starts a new count at a counting speed dependent on the ambient temperature but with a different constant of proportionality from that of the preceding count. This second count is intended to simulate the temperature-dependent progress of an infestation through its second stage from the achievement of the so called "level of minimum infestation" respresented by the curve A of FIG. 1 to the attainment of the maximum level of infestation represented by curve B.

During the course of the second count the information coming from the sensor 1 is irrelevant since, as is known, the state of wetness of the leaves is only critical in the initial phase of an infestation when the spores are penetrating into the stomata of the leaves; after penetration has occurred, the state of leaf wetness is of no importance to the subsequent development of the infestation. The apparatus is operative to isolate the sensor 1 during the course of the second count in the following manner. As already mentioned, at the commencement of the second count the output 15b of the memory 15 drops to logic level "0." Consequently, the input 10b of the logic comparison circuit 10 also falls to logic level "0" preventing the output signal from the sensor 1 from affecting the second count.

During the course of the first count, the memory 16 is held in a "reset" state by the output 15b of the memory 15 which is at logic level "1;" in the reset state of the memory 16, its output 16c is at logic level "1." During the second count the output of the memory 15 is at logic level "0", enabling the memory 16 to be set into a state in which its output 16c is at logic level "0." With the output 15b of the memory 15 at logic level "0," the logic control circuit 17 outputs to the control input 14b of the display device 14 a signal which sets up ready for display the decimal points of the seven segment displays included in the said display device. Upon depression of the push button 27a, the display device 14 is activated and the appropriate display segments for representing the count of the counter 9 are illuminated as are the decimal points; in this manner the second count effected by the counter 9 is displayed, the illuminated decimal points serving to indicate that the displayed count is the second and not the first, effected by the counter 9. The displayed count gives an indication of the speed of advance of the infestation.

The optimum time for effecting a fungicidal treatment of the infestation 15 is during the course of the second count, the treatment being required earlier when the speed of advance of the second count is faster.

Having effected the required fungicidal treatment, the farmer resets the apparatus into its first state by pressing the push button 33 to zero the counter 9 and set the memory 15 into its state in which its output 15b is at logic level "1;" the apparatus is now ready to detect the occurrence of conditions favourable to the development of a new infestation of scab.

Should the farmer fail to press the push button 33 before the end of the second count, then upon this second count finishing the counter 9 outputs a signal a logic level "1" to set the memory 16 into a state in which its output 16c is at logic level "0," (this change in state of the memory 16 being permitted by the current state of the memory 15).

As a result, the logic control circuit 17 which now has a logic "0" applied to its input 17b, sets up the decimal points of the display device 14 for intermittent illumination. Subsequent depression of the push button 27a causes the decimal points of the display device 14 to light up intermittently to indicate that the infestation has reached the maximum infestation level.

Operation of the switch 29 causes the channel selector 12 to present to the display device 14 the signal output from the counter 26 connected to the rain gauge 25. This signal sets up for illumination appropriate ones of the segments of the display device 14, these segments being lit up upon depression of the push button 27a. In this manner an indication is provided of the rain fall which allows the farmer to assess the extend to which a fungicidal treatment applied to the leaves of the infested trees may have been washed away.

Various modifications to the described apparatus are, of course possible. Thus, for example, the pulsed signal generator constituted by elements 4 to 8 could be modified by arranging for the output of the memory 15 to alter the transfer characteristic of the converter 5 between the first and second operational states of the apparatus; in this case, the frequency dividers 6 and 7 of the channel selector 8 could be dispensed with. Alternatively, two counters 9 could be used, connected to the outputs of respective ones of the frequency divider 6 and 7; in this case the memory 15 would control which counter 9 was enabled and again the channel selector 8 could be omitted.

We claim:

1. Apparatus for detecting the climatic conditions favourable to the development of scab on fruit trees and for indicating when to effect a fungicidal treatment thereof, said apparatus comprising:
   a memory settable into first and second states which correspondingly determine first and second operational states of the apparatus;
   a manually-operable control device for setting said memory into its said first state;
   monitoring device controlled by said memory to operate in accordance with the current state of the apparatus, said monitoring device including:
   temperature and humidity sensors arranged to monitor the ambient temperature and humidity,
   a pulsed signal generator connected to said sensors and arranged to output a first pulsed signal to be counted when the apparatus is in its said first state, and a second pulsed signal to be counted when the apparatus is in its said second state, the frequencies of said first and second pulsed signals being differently related to the ambient temperature and humidity, and
   counter means connected to said pulsed signal generator and operative in the said first state of the apparatus to effect a first count by counting the pulses of said first pulsed signal, and in the said second apparatus state to effect a second count by counting the pulses of said second pulsed signal, the counter means including reset and enable inputs and being arranged upon completion of said first count to set said memory into its second state,
   count enable means connected to the said enable input of the counter means and including a sensor arranged to output an enabling signal in the presence of leaf saturation or surface dampness conditions favouring the development of spores, the count enable means being controlled by said memory such that with the apparatus in its said first state the counter means is enabled to effect said first count only when said enabling signal is present, while when the apparatus is in its second state the counter means is continuously enabled to effect said second count,
   a timer circuit connected to said count enable means and operative in the absence of said enabling signal when the apparatus is in its first state, to time a delay period upon the completion of which said timer circuit is arranged to output a reset signal to the said reset input of the counter means, the reappearance of said enabling signal during the timing of said delay period being arranged to deactivate the timer circuit, and
   output means connected to said monitoring device and operable to provide a visual indication of the progress of the counting being effected by the said counter means.

2. Apparatus according to claim 1, wherein the pulsed signal signal generator comprises an amplifier having an amplifying input connected to the temperature sensor and a gain control input connected to the said humidity sensor, a voltage-to-frequency converter the input of which is connected to the output of the amplifier, first and second frequency dividers the inputs of which are both connected to the output of the voltage-to-frequency converter, and a channel selector having first and second inputs respectively connected to the outputs of the first and second frequency dividers and an output connected to the counter means, the channel selector being so arranged that in the first apparatus state the output of the first frequency divider is operatively connected to the counter means while in the second apparatus state the output of the second divider is operatively connected to the counter means.

3. Apparatus according to claim 2, wherein the said amplifier has a non-linear voltage gain characteristic.

4. Apparatus according to claim 2 or claim 3, wherein said count enable means comprises a logic gate having one input connected to said leaf saturation or surface dampness sensor and a second input connected to an output of said memory, the output of the gate being connected to the said enable input of the counter means and to an inhibit input of the timer circuit, and said timer circuit being constituted by a counter the count input of which is connected to the output of the said voltage-to-frequency converter.

5. Apparatus according to claim 1, wherein said output means comprises a display device, a further memory arranged to change from a first state into a second state upon completion of said second count by the counter means, and control circuitry connected to both said memories and operative to set up said display device to display as appropriate a characteristic visual indication fo the progress of said first count, of the progress of said second count, and of the completion of the second count.

6. Apparatus according to claim 5, wherein the display device includes decimal point elements, the control circuitry being arranged to distinguish between the display of said first count, of said second count, and of the completion of the second count by respectively setting up said decimal point elements of the display device to be non-illuminated, to be continuously illuminated, and to be intermittently illuminated.

7. Apparatus according to claim 1, further comprising: an electrical rain gauge operable to provide output pulses proportional in number to the instantaneous value of the level of rain-fall;
- a rain-fall counter the count input of which is connected to the output of the rain gauge;
- a channel selector for selectively connecting the count output either of the said counter means or of the said rain-fall counter to the said output means; and
- a second manually-operable control device arranged to control the operation of the channel selector.

8. Apparatus according to claim 1, wherein the said humidity sensor is a threshold hygrometer with a pair of normally-open contacts which are arranged to close when the ambient humidity exceeds a predetermined threshold value.

9. Apparatus according to claim 1, wherein the said temperature sensor is constituted by a temperature sensitive resistance having a negative temperature coefficient.

* * * * *